UNITED STATES PATENT OFFICE.

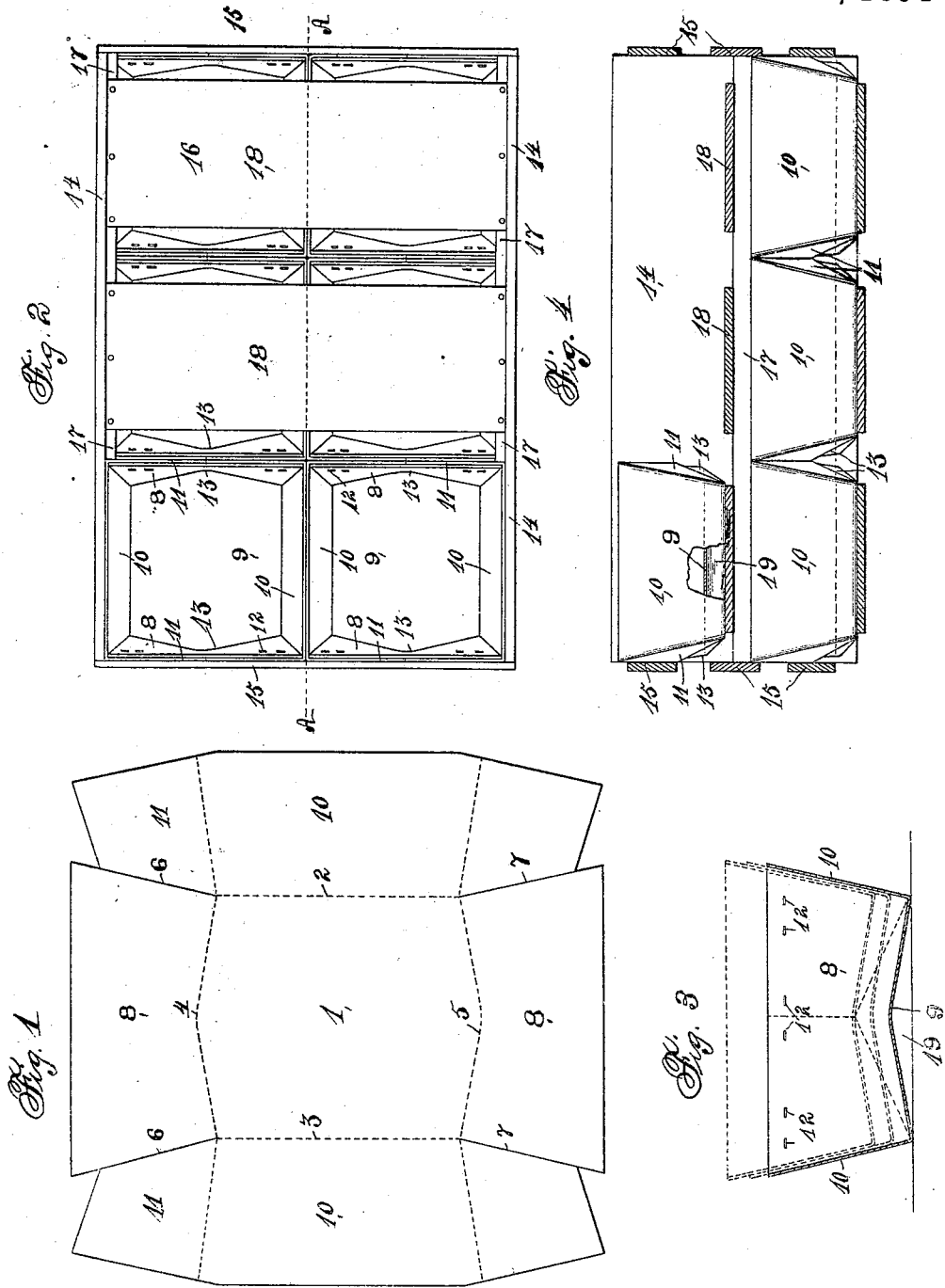

ENOS L. WALKER, OF ST. LOUIS, MISSOURI.

FRUIT OR BERRY BOX.

SPECIFICATION forming part of Letters Patent No. 512,571, dated January 9, 1894.

Application filed April 3, 1893. Serial No. 468,807. (No model.)

*To all whom it may concern:*

Be it known that I, ENOS L. WALKER, of the city of St. Louis and State of Missouri, have invented certain new and useful Improvements in Fruit or Berry Boxes and Crates Therefor, of which the following is a full, clear, and exact description, reference being had to the accompanying drawings, forming a part hereof.
My invention relates to an improved fruit and berry box and crate therefor, and consists in the novel construction, combination and arrangement of parts hereinafter described and pointed out in the claims.
The object of my invention is, principally, to provide an improved fruit or berry-box made of veneer or other material which may be packed for shipment in nests, and yet have a clear passage beneath the bottom of the box for purposes of ventilation.

In the drawings: Figure 1 is a plan view of the blank from which my improved box is made. Fig. 2 is a plan view of a crate containing a number of the boxes, and having its top cover removed. Fig. 3 is a sectional end elevation of the box. Fig. 4 is a sectional elevation of the devices shown in Fig. 2, the section being taken on line A—A of said figure.

1 indicates the portion of the blank which forms the bottom of the box. This blank is constructed, in any desired numbers of substantially the shape here shown, and then it is also creased upon its under surface, at 2, 3, 4 and 5, and provided with the slits 6 and 7 in its opposite ends. This may be done by any known form of machinery or by any desired means. Then the end flaps 8 are bent up to a position near a right angle to the bottom, and this act by reason of the peculiar relative positions and form of the creases 5 and 4, operates to form an elevated longitudinal ridge 9 in said bottom, the purpose of which will appear hereinafter. Then the opposite side-flaps 10 are elevated to a position near a right angle to the bottom previous to forming the ridge therein, and the short end flaps 11 are then folded inward, first one into contact with the outer surface of the end-flap 8 at one end of the box, and then the other at said end is superposed upon the flap 8 and all three end flaps at one end of the box are firmly secured together in this position by means of suitable wire-staples or other fastenings 12 which are inserted through these parts and clinched or otherwise secured in position. The opposite end of the box is made in a similar manner, or it may be simultaneous with the operations upon the first mentioned end, as may be desired. The box has now assumed the form shown in Figs. 2, 3, and 4, and is ready to be nested in numbers for shipping purposes, or to be packed in crates.

It will be observed from the above that my improved box is constructed with a bottom having a longitudinally extending apexial ridge and outwardly flaring sides and ends, the apex of said ridge being within the box, so that a number of them may be very nicely nested, as shown in dotted lines in Fig. 3.

It will further be observed that each end of the box is provided with an outwardly projecting bulge, or ridge 13, extending vertically from the apex of the ridge 9 in the bottom upward to the upper edge of the box. This ridge serves to greatly strengthen the ends of the box. The bottom of the box is inclined from the apexial ridge 9 on each side thereof.

Referring now to Figs. 2 and 4, it will be seen that I have shown an improved crate especially adapted for holding numbers of my improved box filled with fruit or berries.

My box being, as before stated, of the form known as a "nesting" box, it is obvious that when filled with fruit or berries one cannot be placed above another without injuring the berries or fruit contained in the one next below it, unless some suitable support is provided for the purpose.

It will thus be apparent that my improved box cannot be crated with other boxes of same kind in superposed layers, without a crate of special construction is provided.

14 indicates the vertical sides of the crate, and 15 the ends thereof, it being provided with the usual bottom and top constructed of open slat work for purposes of ventilation. On the bottom of this crate a series of the boxes is placed so as to form one layer, and upon the upper edges of the boxes forming this layer an especial supporting frame 16, now to be described, is located. This frame is composed of opposite longitudinal strips 17 which are secured to slats 18 having such length as corresponds to the interior dimensions of the crate, so that said frame may be placed within said crate with the strips 17 in contact with the upper edges of the layers of boxes in the crate. Said strips 17 engage the edges of the boxes which are directly adjacent the sides of the crate, and at no other place. It will be observed that the construction is such that the upper edges of the boxes forming a layer are substantially in a horizontal line. The vertical width of the strips 17 is such that the slats 18 are sufficiently elevated above the upper edges of the layers of boxes to permit the heaping up of fruit or berries in the boxes beneath them, without injury to said fruit or berries. Likewise, the upper edges of the sides 14 of the crate are of such height that the covering slats will be elevated a distance above the upper edges of the upper layer of boxes contained within the crate.

With the above construction, after the first layer of boxes has been placed within the crate, the supporting-frame 16 is placed within the said crate with its strips 17 in engagement with the upper edges of said layer, and then a second layer of boxes is placed upon the slats 18 of said frame, and so on, according to the number of layers desired.

I will explain that in Figs. 2 and 4 I have shown a complete bottom layer of boxes, and only a portion of a second layer, the top slats of the crate not being shown.

The supporting-frame is readily separated from the crate, as it loosely rests upon the boxes beneath it.

By the above described construction, in a fruit or berry-box, and crate therefor, a straight ventilating-passage 19, having each of its ends open, is formed in the lower portion of the box, and as the several boxes are placed end to end in a crate in shipping fruits or berries, it will be seen that I have provided a direct ventilating passage extending from end to end of the entire crate and having its outer ends fully open to the atmosphere. This construction is clearly indicated by dotted lines in Fig. 4. By reason of it the fruit or berries shipped in these improved boxes will be kept in much better condition than if shipped in boxes having the ordinary flat bottom.

What I claim is—

1. An improved fruit or berry box, constructed with laterally flaring sides and ends to nest with other boxes and having a bottom inclined downward from an apexial ridge thereof, and arranged with a ventilating passage having opposite open ends, and located beneath the bottom of the box, substantially as herein specified.

2. The improved fruit or berry box constructed of a veneer blank having curved irregular creases 4 and 5 and side creases 2 and 3 in its under side adjacent its ends, slits 6 and 7 in its ends whereby an elevated longitudinal ridge in its bottom is formed by the act of placing the end flaps of the box in proper relative position for use, and fastening devices for securing the parts in place substantially as herein specified.

3. The improved fruit or berry box having outwardly flaring sides and ends, an outward vertical bulge in each end and a bottom provided with a longitudinally extending apexial ridge which projects upward within said box, substantially as herein specified.

In testimony whereof I affix my signature in presence of two witnesses.

ENOS L. WALKER.

Witnesses:
MICHAEL HAMMEL,
FRANK H. MICHEL.